United States Patent
Koga

(10) Patent No.: US 9,937,787 B2
(45) Date of Patent: Apr. 10, 2018

(54) FILLER PIPE

(71) Applicant: HONDA MOTOR CO., LTD., Tokyo (JP)

(72) Inventor: Yuki Koga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 10 days.

(21) Appl. No.: 15/182,806

(22) Filed: Jun. 15, 2016

(65) Prior Publication Data
US 2016/0368375 A1 Dec. 22, 2016

(30) Foreign Application Priority Data
Jun. 19, 2015 (JP) ................................. 2015-123445

(51) Int. Cl.
*B60K 15/077* (2006.01)
*B60K 15/04* (2006.01)

(52) U.S. Cl.
CPC ............ *B60K 15/077* (2013.01); *B60K 15/04* (2013.01); *B60K 2015/049* (2013.01); *B60K 2015/0477* (2013.01); *B60K 2015/0775* (2013.01)

(58) Field of Classification Search
CPC .................. B60K 15/077; B60K 15/04; B60K 2015/0477; B60K 2015/049; B60K 2015/0775
USPC ........................................................ 141/350
See application file for complete search history.

(56) References Cited

U.S. PATENT DOCUMENTS

| | | | | |
|---|---|---|---|---|
| 7,866,357 B2* | 1/2011 | Compere | ............... | B60K 15/03 123/1 A |
| 2001/0017360 A1* | 8/2001 | Watanabe | ........... | F16K 31/0655 251/129.17 |
| 2005/0121105 A1* | 6/2005 | Kaneko | .................. | B60K 15/04 141/301 |
| 2009/0145516 A1* | 6/2009 | Wells | ..................... | B60K 13/04 141/367 |
| 2010/0206873 A1* | 8/2010 | Lamprecht | ......... | B60K 15/0403 220/86.3 |
| 2014/0352846 A1* | 12/2014 | Ryu | ....................... | B60K 15/04 141/350 |
| 2016/0368375 A1* | 12/2016 | Koga | ................... | B60K 15/077 |

FOREIGN PATENT DOCUMENTS

JP 2009-18755 A 1/2009

* cited by examiner

*Primary Examiner* — Timothy L Maust
*Assistant Examiner* — Andrew Schmid
(74) *Attorney, Agent, or Firm* — Westerman, Hattori, Daniels & Adrian, LLP

(57) ABSTRACT

A filler pipe includes a retainer capable of retaining a fuel filler gun inserted through a fuel filler opening, and a pipe main body connecting the retainer and a fuel tank. The retainer has a stopper limiting the insertion of the fuel filler gun. A flow guide that guides the flow of fuel is provided on the downstream side of the stopper with respect to the flow direction of fuel supplied from the fuel filler gun. The flow guide has a guide portion extending at an angle with respect to the flow direction of fuel.

12 Claims, 5 Drawing Sheets

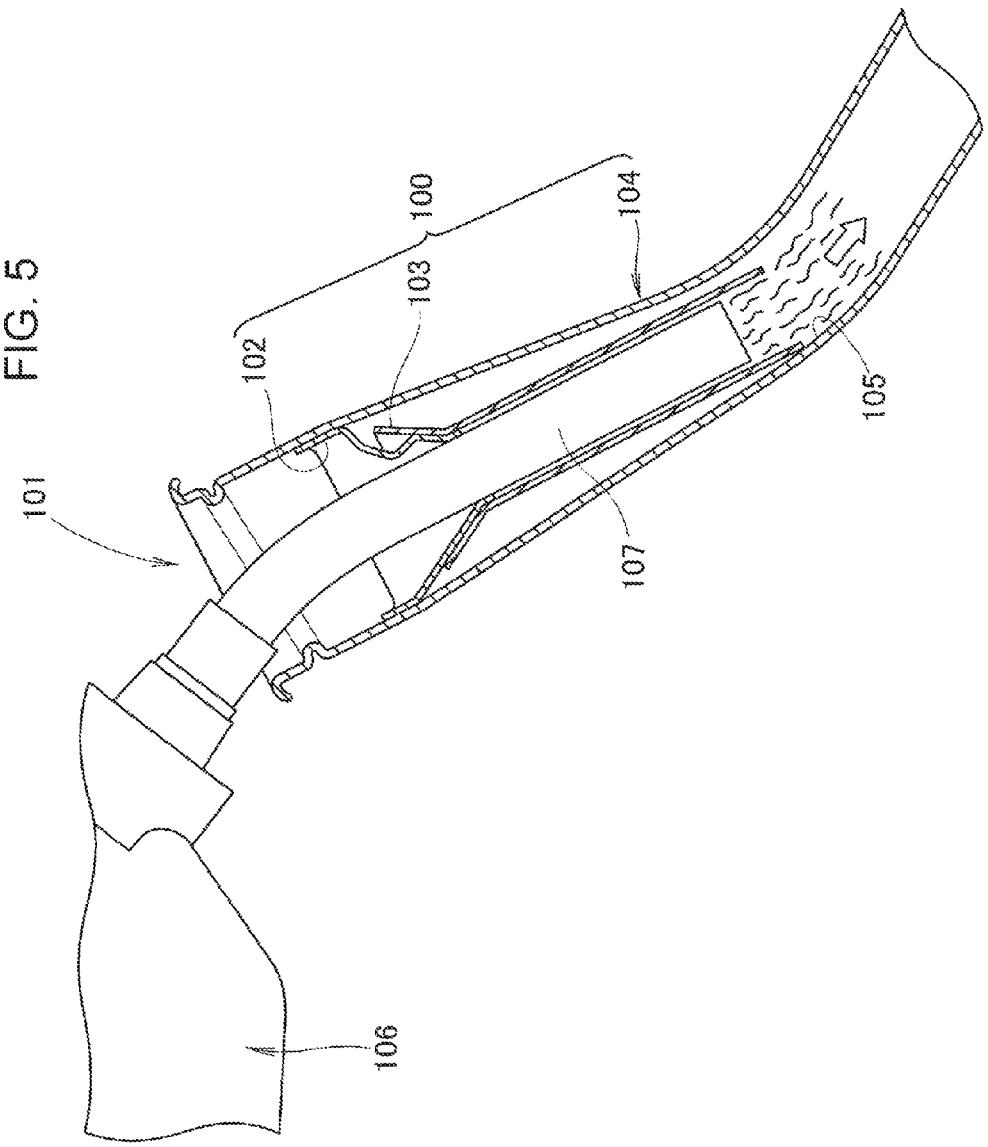

FILLER PIPE

CROSS REFERENCES TO RELATED APPLICATIONS

The present application claims priority under 35 U.S.C. § 119 to Japanese Patent Application No. 2015-123445, filed Jun. 19, 2015, entitled "Filler Pipe." The contents of this application are incorporated herein by reference in their entirety.

TECHNICAL FIELD

The present disclosure relates to a filler pipe having a retainer.

BACKGROUND

A filler pipe connecting a fuel filler opening and a fuel tank has a retainer capable of retaining a fuel filler gun inserted through the fuel filler opening. For example, as a related art relating to a filler pipe having a retainer, an art is disclosed in Japanese Unexamined Patent Application Publication No. 2009-18755.

Reference is made to FIG. 5, which is a mirror-reversed reproduction, with reference numerals changed, of FIG. 6 of Japanese Unexamined Patent Application Publication No. 2009-18755. A filler pipe 100 has, near the fuel filler opening 101 thereof, a substantially truncated conical retainer 102 on the inner peripheral surface thereof. An extension pipe 103 communicating with the retainer 102 is provided at the distal end of the retainer 102. The distal end of the extension pipe 103 is located short of a bent portion 105 of the filler pipe main body 104.

When fuel is supplied from a fuel filler gun 106, the fuel is discharged from the distal end of the extension pipe 103, hits the bent portion 105, and flows along the inner peripheral wall of the filler pipe main body 104. That is, regardless of the amount of insertion of the nozzle 107 of the fuel filler gun 106, the fuel always passes through the extension pipe 103, and starts to flow from the bent portion 105. Therefore, the fuel can be caused to flow in a constant state.

The extension pipe 103 needs to extend short of the bent portion 105 of the filler pipe main body 104. Therefore, depending on the position where the bent portion 105 of the filler pipe main body 104 is formed, the length of the extension pipe 103 changes, and the force of the fuel discharged from the extension pipe 103 also changes.

As a result, in the filler pipe 100 shown in Japanese Unexamined Patent Application Publication No. 2009-18755, the flow of fuel may be destabilized depending on the shape of the pipe main body 104. It would be desirable to have a filler pipe that could cause fuel to flow in a constant state regardless of the shape of the pipe main body 104 thereof.

SUMMARY

The present application, for example, describes a filler pipe having a retainer that can cause fuel to flow stably.

According to a first aspect of the present disclosure, a filler pipe leading to a fuel tank includes a retainer capable of retaining a fuel filler gun inserted through a fuel filler opening, and a pipe main body extending from the retainer to the fuel tank. The retainer has a stopper limiting the insertion of the fuel filler gun. A flow guide is disposed on the side of the stopper nearer to the fuel tank. A guide portion extending at an angle with respect to the cross-sectional centerline of the pipe main body is formed at the end of the flow guide nearer to the fuel tank.

According to a second aspect of the present disclosure, it is preferable that the flow guide have a branching portion for causing part of the fuel to flow toward the guide portion, and the part of the fuel be guided by the guide portion and join the rest of the fuel at the end of the guide portion nearer to the fuel tank.

According to a third aspect of the present disclosure, it is preferable that the flow guide be formed in the retainer.

According to a fourth aspect of the present disclosure, it is preferable that the flow guide be formed in the pipe main body.

In the first aspect of the present disclosure, in the filler pipe, a flow guide is disposed on the side of the stopper limiting the insertion of a fuel filler gun nearer to the fuel tank, and a guide portion extending at an angle with respect to the cross-sectional centerline of the pipe main body is formed at the end of the flow guide.

Fuel discharged from the fuel filler gun flows along the flow guide. Since the guide portion of the flow guide extends at an angle with respect to the cross-sectional centerline of the pipe main body, fuel reaching the guide portion flows toward the inner peripheral wall of the pipe main body. Fuel reaches the inner peripheral wall of the pipe main body, and starts to flow through the pipe main body. That is, by causing fuel to flow along the inner peripheral wall, splash of fuel in the pipe main body can be suppressed, and fuel can be caused to flow stably.

The position from which fuel starts to flow along the inner peripheral wall is not the bent portion of the pipe main body but the distal end of the flow guide. That is, regardless of the shape of the pipe main body, fuel can be caused to start to flow from the distal end of the flow guide along the inner peripheral wall. Therefore, fuel can be caused to flow through the filler pipe more stably.

As described above, the guide portion of the flow guide extends at an angle with respect to the cross-sectional centerline of the pipe main body. Therefore, even if, during fuel filling, fuel flows back from the downstream side to the upstream side, the fuel flowing back strikes against the guide portion and can be prevented from flowing further to the upstream side. The fuel can thereby be prevented from splashing on a fueling person.

The retainer has a stopper limiting the insertion of the fuel filler gun. Since the guide portion capable of preventing fuel from flowing upstream and the stopper limiting the insertion of the nozzle of the fuel filler gun are provided, the nozzle is unlikely to come into contact with the fuel. As a result, an automatic stop device can be prevented from being activated before the fuel tank is filled with fuel.

In the second aspect of the present disclosure, the flow guide has a branching portion for causing part of the fuel to flow toward the guide portion, and the part of the fuel is guided by the guide portion and joins the rest of the fuel at the downstream end of the guide portion.

Specifically, fuel discharged from the fuel filler gun and reaching the flow guide is branched by the branching portion into two flows: one toward the guide portion and the other.

Part of the fuel flows toward the guide portion, and, after reaching the guide portion, flows along a direction in which the guide portion extends. That is, part of the fuel flows at an angle with respect to the cross-sectional centerline of the pipe main body.

On the other hand, as for the rest of the fuel, the part of the fuel guided by the guide portion and the rest of the fuel brought near to the inner peripheral wall join each other on the downstream side of the flow guide. When joining, the rest of the fuel is pushed by the guided part of the fuel toward the inner peripheral wall of the pipe main body. Fuel can thereby be caused to flow along the inner peripheral wall of the pipe main body.

That is, since the branching portion is formed, fuel is caused to flow toward the inner peripheral wall not only when guided by the guide portion but also when branched. Therefore, more fuel can be caused to flow along the inner peripheral wall.

In the third aspect of the present disclosure, the flow guide is formed in the retainer. The retainer is a portion retaining the fuel filler gun. The guide portion of the flow guide also serves as a breakwater that prevents backflow of fuel. That is, since the guide portion that prevents backflow of fuel is located near the nozzle of the fuel filler gun, malfunction of the automatic stop device can be prevented more reliably.

In the fourth aspect of the present disclosure, the flow guide is formed in the pipe main body. Therefore, fuel can be caused to flow along the inner peripheral wall from any position of the pipe main body. Fuel can be caused to flow optimally according to the shape of individual pipes.

BRIEF DESCRIPTION OF THE DRAWINGS

The advantages of the disclosure will become apparent in the following description taken in conjunction with the following drawings.

FIG. 5 illustrates the operation of a filler pipe according to a related art.

DETAILED DESCRIPTION

An embodiment of the present disclosure will be described below with reference to the accompanying drawings. In the description, the terms "front" and "rear" mean front and rear with respect to the direction of travel of the vehicle. In the figures, Fr denotes front, Rr denotes rear, Up denotes up, and Dn denotes down. For the flow of fuel, the fuel filler opening side of the filler pipe will be referred to as the upstream side, and the fuel tank side thereof will be referred to as the downstream side. Us denotes the upstream side, and Ds denotes the downstream side.

Embodiment

Figure 1:
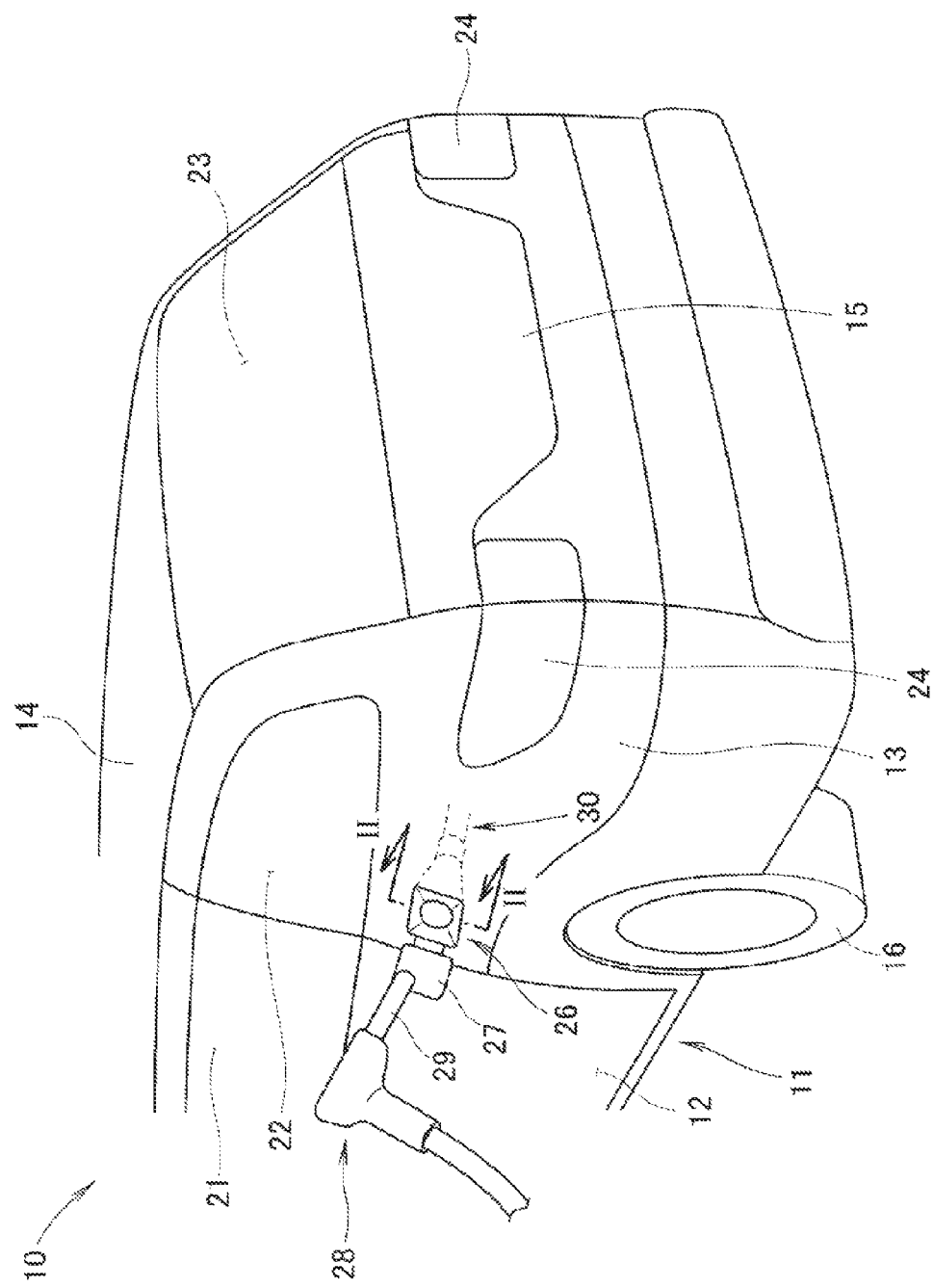
FIG. 1 is a perspective view of a vehicle having a filler pipe according to an embodiment of the present disclosure.

Reference is made to FIG. 1, which shows a vehicle 10 having a filler pipe 30 according to the present disclosure. The vehicle 10 has a vehicle body 11, a rear door 12 provided on the side of the vehicle body 11, a rear fender 13 covering the rear of the side of the vehicle body 11, a roof panel 14 covering the top of the vehicle body 11, a tailgate 15 provided on the rear of the vehicle body 11, and rear wheels 16 (only the left rear wheel 16 is shown).

The rear door 12 is provided with a rear side glass 21, the rear fender 13 is provided with a rear quarter glass 22, and the tailgate 15 is provided with a rear glass 23.

The rear fender 13 and the tailgate 15 are each provided with a part of a tail lamp 24 near the boundary therebetween.

In a state where the tailgate 15 is closed, tail lamps 24 are formed on both left and right sides.

A fuel filler opening 26 through which fuel is injected by a fuel filler gun 28 is formed above the left rear wheel 16. The fuel filler opening 26 is provided with an openable and closable fuel filler opening lid 27. The fuel filler opening 26 leads to the filler pipe 30.

Figure 2:
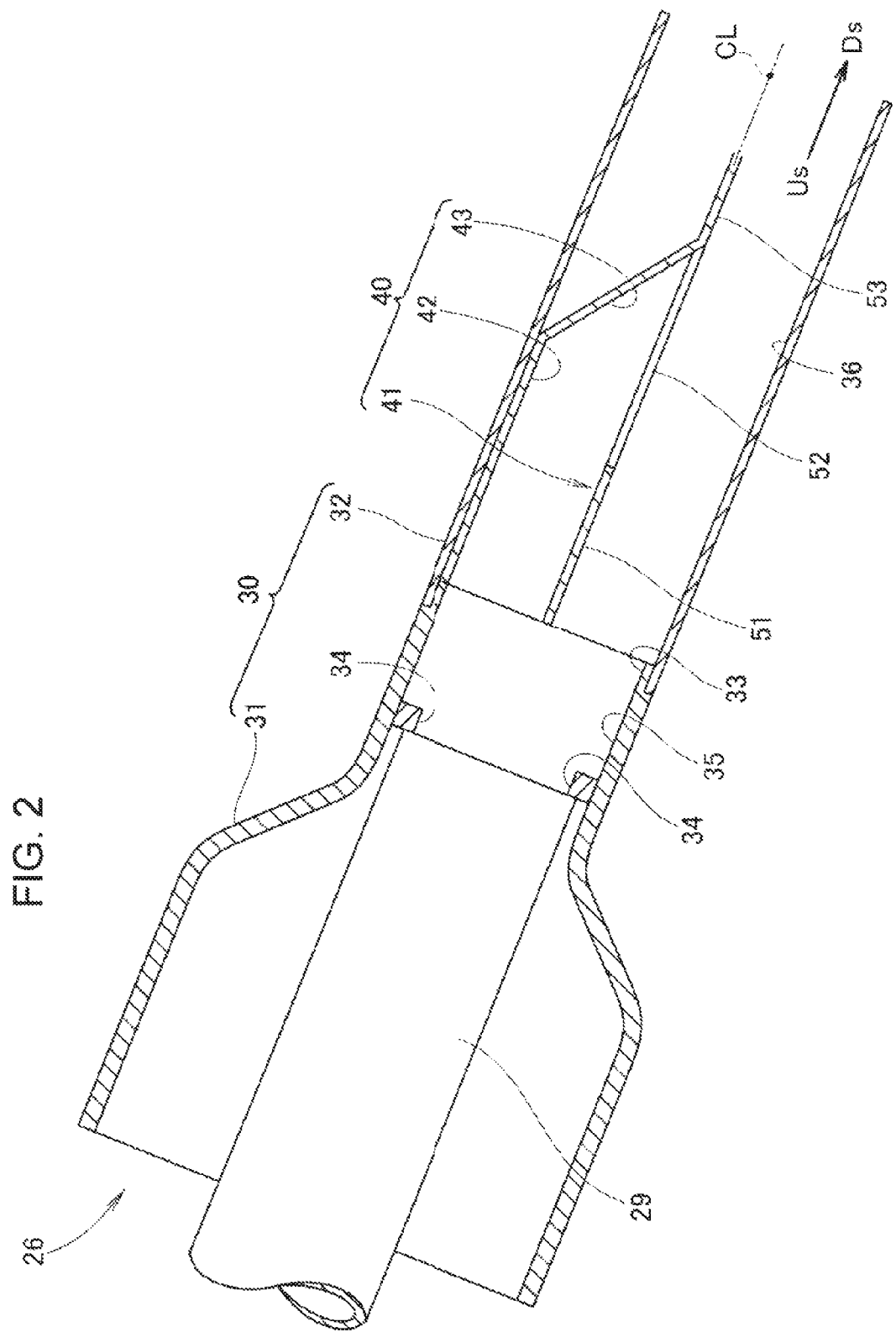
FIG. 2 is a sectional view taken along line II-II of FIG. 1.

Reference is made to FIG. 2. The filler pipe 30 has a retainer 31 capable of retaining the fuel filler gun 28 (see FIG. 1) inserted through the fuel filler opening 26, and a pipe main body 32 connecting the retainer 31 and a fuel tank.

A step portion 33 the outer peripheral surface of which is shaved is formed at the end of the retainer 31 that is closer to the pipe main body 32. The step portion 33 is inserted into the pipe main body 32, and the retainer 31 thereby connects with the pipe main body 32.

Figure 3:
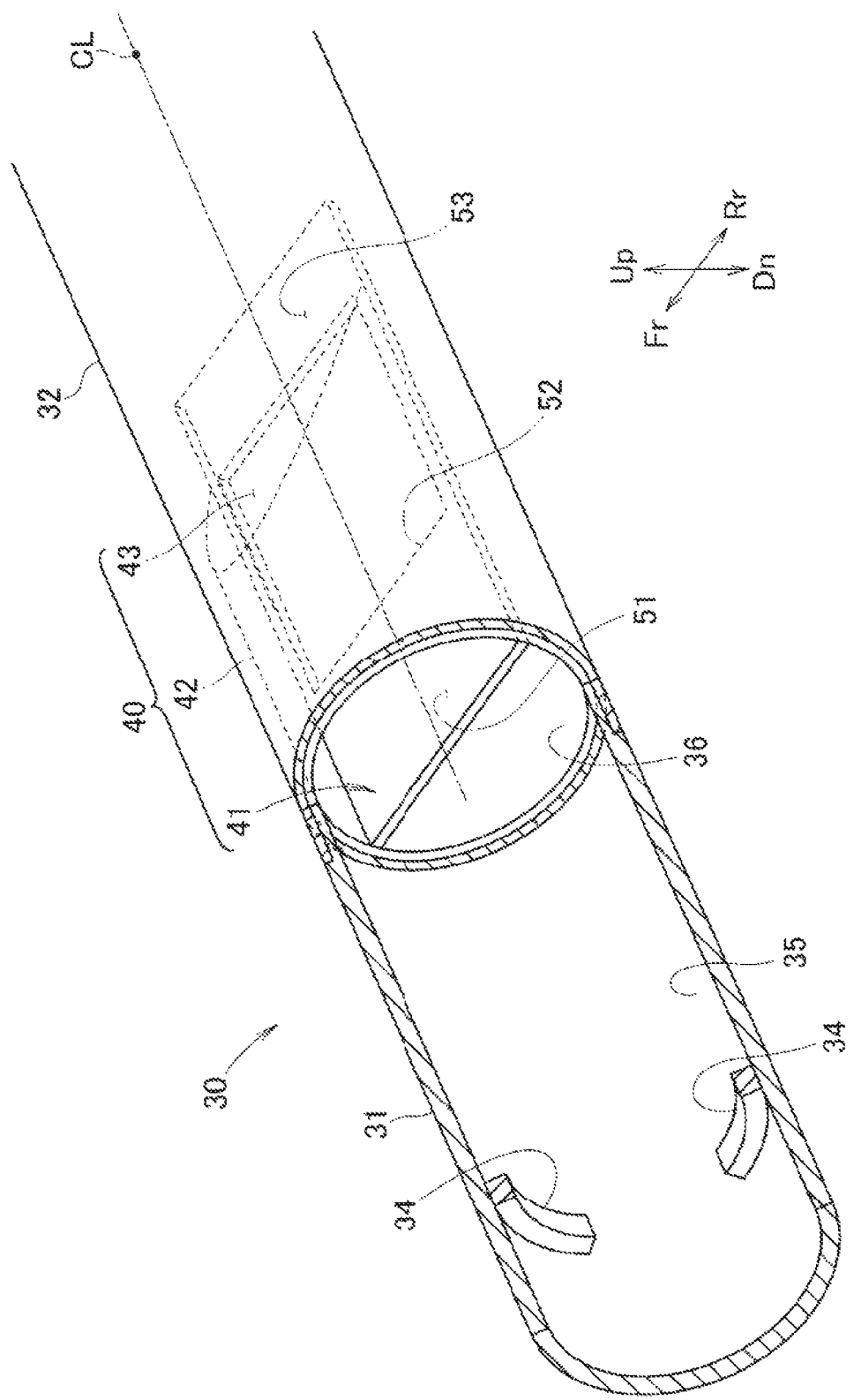
FIG. 3 illustrates a flow guide provided in the filler pipe shown in FIG. 1.

Reference is also made to FIG. 3. The retainer 31 has three stoppers 34 (only two of them are shown in FIG. 2) that limit the amount of insertion of the nozzle 29 of the fuel filler gun 28. The stoppers 34 have a fan-like shape, and are disposed spaced apart from each other on the inner peripheral wall 35 of the retainer 31.

The filler pipe 30 is further provided with a flow guide 40 that guides the flow of fuel on the downstream side (fuel tank side) of the stoppers 34 with respect to the flow direction of fuel supplied from the fuel filler gun 28.

The flow guide 40 consists of a flat plate 41 having a rectangular hole formed therein, a semicylinder portion 42 provided above the flat plate 41, and an inclined portion 43 (guide portion 43) covering the downstream end of the semicylinder portion 42.

The length of the short side of the flat plate 41 is substantially equal to the diameter of the pipe main body 32. The size of the semicircle of the semicylinder portion 42 is substantially equal to that of the circular arc part of the pipe main body 32.

The semicylinder portion 42 of the flow guide 40 is joined to the distal end of the retainer 31, and the flow guide 40 is thereby attached to the retainer 31. In a state where the retainer 31 is inserted into the pipe main body 32, the flow guide 40 is located in the pipe main body 32.

The flow guide 40 may be formed integrally with the retainer 31.

The flow guide 40 attached to the retainer 31 will be described below.

The flat plate 41 and the semicylinder portion 42 extend in the direction of the cross-sectional centerline CL of the pipe main body 32. On the other hand, the inclined portion 43 extends at an angle with respect to the direction of the cross-sectional centerline CL of the pipe main body 32.

The upstream part of the flat plate 41 serves as a branching portion 51 for causing part of fuel to flow toward the inclined portion 43 (guide portion). The hole of the flat plate 41 serves as an outlet 52 for fuel flowing into the inclined portion 43. The outlet 52 is open downward. The downstream part of the flat plate 41 serves as a flow straightening portion 53 that straightens the flow of fuel brought near to the inner peripheral wall 36.

Figure 4:
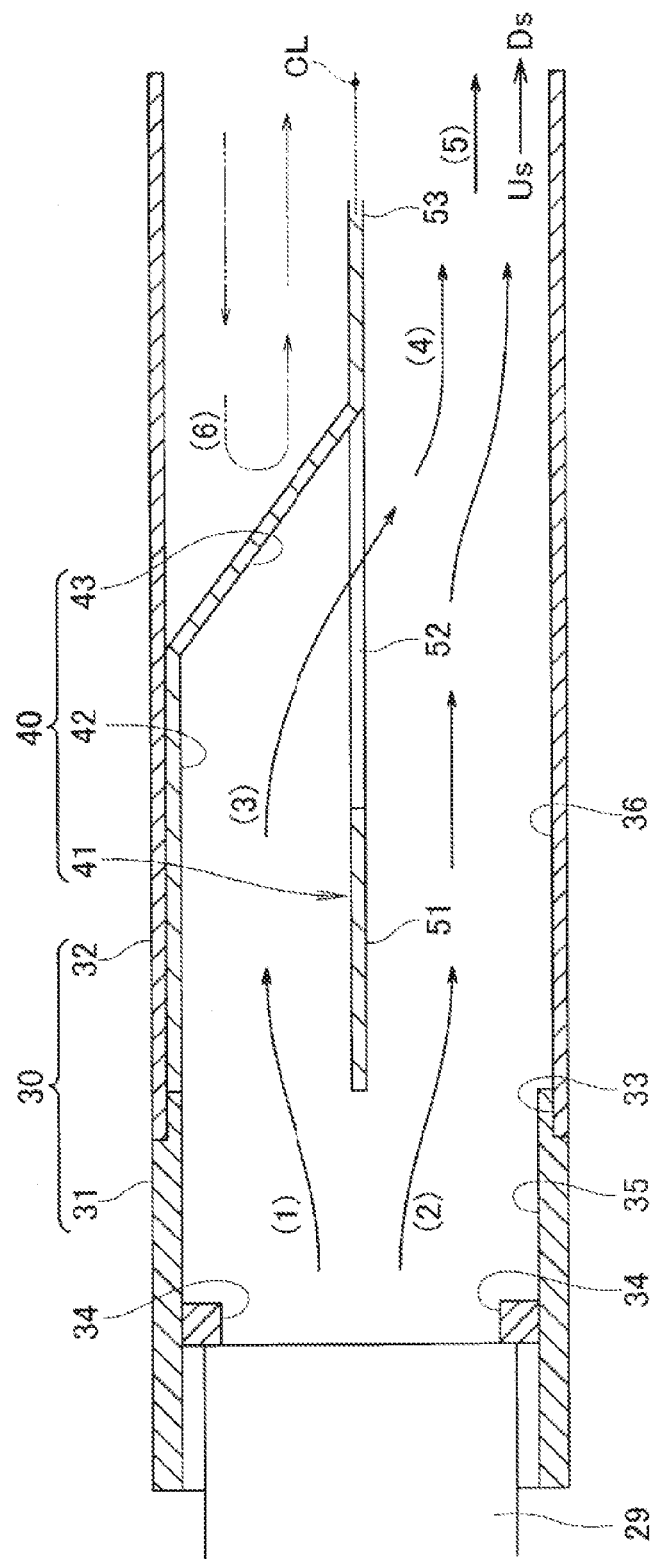
FIG. 4 illustrates the operation of the filler pipe shown in FIG. 3.

Next, the operation and advantageous effects of the present disclosure will be described. Reference is made to FIG. 4. The flow guide 40 is disposed downstream of the stoppers 34 limiting the insertion of the nozzle 29. At the downstream end of the flow guide 40, the inclined portion 43 (guide portion 43) is formed that extends at an angle with respect to the cross-sectional centerline CL of the pipe main body 32.

Fuel discharged from the nozzle 29 flows along the flow guide 40. Since the inclined portion 43 of the flow guide 40 extends at an angle with respect to the cross-sectional centerline CL of the pipe main body 32, fuel reaching the inclined portion 43 flows downward and toward the inner peripheral wall 36 of the pipe main body 32. Fuel reaches the inner peripheral wall 36 of the pipe main body 32, and starts to flow through the pipe main body 32. That is, splash of fuel in the pipe main body 32 can be suppressed, and fuel can be caused to flow stably.

The position from which fuel starts to flow along the inner peripheral wall 36 is the distal end of the flow guide 40. That is, regardless of the shape of the pipe main body 32, fuel can be caused to start to flow from the distal end of the flow guide 40 along the inner peripheral wall 36. Therefore, fuel can be caused to flow through the filler pipe 30 more stably.

The inclined portion 43 of the flow guide 40 extends at an angle with respect to the cross-sectional centerline CL of the pipe main body 32. As shown by arrow (6), even if, during fuel filling, fuel flows back from the downstream side to the upstream side, the fuel strikes against the inclined portion 43 and can be prevented from flowing further to the upstream side. The fuel can thereby be prevented from splashing on a fueling person.

The retainer 31 has stoppers 34 limiting the insertion of the nozzle 29. Since the inclined portion 43 preventing fuel from flowing upstream and the stoppers 34 limiting the insertion of the nozzle 29 are provided, the nozzle 29 is unlikely to come into contact with the fuel. As a result, an automatic stop device can be prevented from being activated before the fuel tank is filled with fuel.

As described above, the stoppers 34 limit the insertion of the nozzle 29 of the fuel filler gun 28, and the nozzle 29 does not deeply enter the retainer 31. In general, in some of the fuel filler openings employing a capless structure having a shutter member and a flap valve, the nozzle is not inserted deeply into the retainer. Therefore, the filler pipe 30 is also suitable for a fuel filler opening having a capless structure.

The flow guide 40 further has the branching portion 51 for causing part of fuel to flow toward the inclined portion 43.

Fuel discharged from the nozzle 29 and reaching the flow guide 40 is branched by the branching portion 51 into two flows: one toward the inclined portion 43 shown by arrow (1) and the other shown by arrow (2). As shown by arrow (3), part of the fuel flows toward the inclined portion 43, and, after reaching the inclined portion 43, flows along a direction in which the inclined portion 43 extends.

On the other hand, as shown by arrow (4), the rest of the fuel joins the part of the fuel guided by the inclined portion 43 at the outlet 52 of the flow guide 40 (on the downstream side of the flow guide). When joining, the rest of the fuel is pushed by the guided part of the fuel toward the inner peripheral wall 36 of the pipe main body 32. As shown by arrow (5), the joined fuel is straightened by the straightening portion 53, and flows along the inner peripheral wall 36 of the pipe main body 32.

That is, since the branching portion 51 is formed, fuel is caused to flow toward the inner peripheral wall 36 not only when guided by the inclined portion 43 (see arrow (3)) but also when branched (see arrows (1) and (2)). Therefore, more fuel can be caused to flow along the inner peripheral wall 36.

The part and the rest of the fuel branched by the branching portion 51 do not come into contact with each other in the part partitioned by the branching portion 51.

In addition, the flow guide 40 is joined to the distal end of the retainer 31. As described above, the inclined portion 43 of the flow guide 40 also serves as a breakwater that prevents backflow of fuel (see arrow (6)). That is, since the inclined portion 43 that prevents backflow of fuel is located near the nozzle 29, malfunction of the automatic stop device can be prevented more reliably.

Although, in this embodiment, the flow guide 40 is joined to the distal end of the retainer 31, the flow guide 40 may be provided in the pipe main body 32.

Reference is made to FIG. 3. Although the outlet 52 faces downward, the outlet 52 may be inclined to the front or back, for example. By changing the direction of the outlet 52 according to the extending direction or shape of the filler pipe 30, fuel can be caused to flow stably.

Although the three stoppers 34 have a fan-like shape and are disposed spaced apart from each other on the inner peripheral wall, for example, an annular stopper may be formed integrally with the retainer 31 by narrowing the distal end of the retainer 31. Although the guide portion extending at an angle with respect to the cross-sectional centerline CL of the pipe main body is an inclined portion 43 extending linearly, it may have, for example, a circular arc shape. That is, the embodiment of the present disclosure is not limited to these forms.

The filler pipe of the present disclosure is suitable for a passenger car. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A filler pipe leading to a fuel tank, the filler pipe comprising:
    a retainer capable of retaining a fuel filler gun inserted through a fuel filler opening; and
    a pipe main body extending from the retainer to the fuel tank,
    wherein the retainer has a stopper limiting the insertion of the fuel filler gun,
    wherein a flow guide is disposed on a fuel tank side of the stopper in the filer pipe, and
    wherein a guide portion extending in a direction intersecting a longitudinal centerline extending in a longitudinal direction of the pipe main body is disposed at an end portion of the flow guide located on a fuel tank side of the flow guide,
    wherein the flow guide is a split plate extending along the longitudinal direction of the pipe main body,
    wherein the split plate partitions an inside of the pipe main body into a one side part and an opposite side part,
    wherein the guide portion is disposed in the one side part, and extends from an inner surface of the filler pipe, toward the fuel tank, to a location distanced from the split plate, and
    wherein the guide portion is a wall partitioning the one side part into a retainer side and a fuel tank side of the pipe main body to block flow of the fuel between the retainer side and the fuel tank side of the pipe main body.

2. The filler pipe according to claim 1,
    wherein the split plate causes part of the fuel to flow toward the guide portion, and wherein the part of the fuel is guided by the guide portion and joins the rest of the fuel at an end of the guide portion located on a fuel tank side of the guide portion.

3. The filler pipe according to claim 1, wherein the flow guide is formed in the retainer.

4. The filler pipe according to claim 1, wherein the flow guide is formed in the pipe main body.

5. The filler pipe according to claim 1,
wherein the guide portion extends from the inner surface of the filler pipe to the centerline.

6. The filler pipe according to claim 1,
wherein the split plate includes an opening upstream of the guide portion.

7. The filler pipe according to claim 6,
wherein
the opening communicates the one side part with the opposite side part.

8. The filler pipe according to claim 7,
wherein the split plate deviates the fuel toward the one side part and the opposite side part.

9. The filler pipe according to claim 1, further comprising a flow straightening portion disposed on a fuel tank side of the guide portion.

10. The filler pipe according to claim 9,
wherein the flow straightening portion is a flat plate.

11. The filler pipe according to claim 1, wherein the stopper protrudes inward to reduce cross-sectional area of the retainer.

12. A vehicle comprising the filler pipe according to claim 1.

* * * * *